United States Patent [19]

Combest et al.

[11] Patent Number: 4,527,429
[45] Date of Patent: Jul. 9, 1985

[54] PRESSURE INDICATOR

[75] Inventors: H. E. Buddy Combest; Larry M. Tunks, both of Huntington Beach, Calif.

[73] Assignee: Aladdin Equipment Company, Huntington Beach, Calif.

[21] Appl. No.: 564,469

[22] Filed: Dec. 21, 1983

[51] Int. Cl.³ .............................................. G01L 7/16
[52] U.S. Cl. ....................................... 73/744; 116/272
[58] Field of Search ............................ 73/744, 146.8; 116/34 R, 266, 272

[56] References Cited

U.S. PATENT DOCUMENTS 4,193,295  3/1980  Curran ................................ 73/744

Primary Examiner—Donald O. Woodiel
Attorney, Agent, or Firm—Lyon & Lyon

[57] ABSTRACT

A pressure gauge is provided for use with a swimming pool filter system to indicate the condition of the swimming pool filter and advise when changing of the filter element is necessary. The pressure gauge is also useful to remove trapped air within the filter system and relief any vacuum that may be built up within the system by permitting bleed air to pass into and out of the filter system.

8 Claims, 2 Drawing Figures

U.S. Patent   Jul. 9, 1985   4,527,429
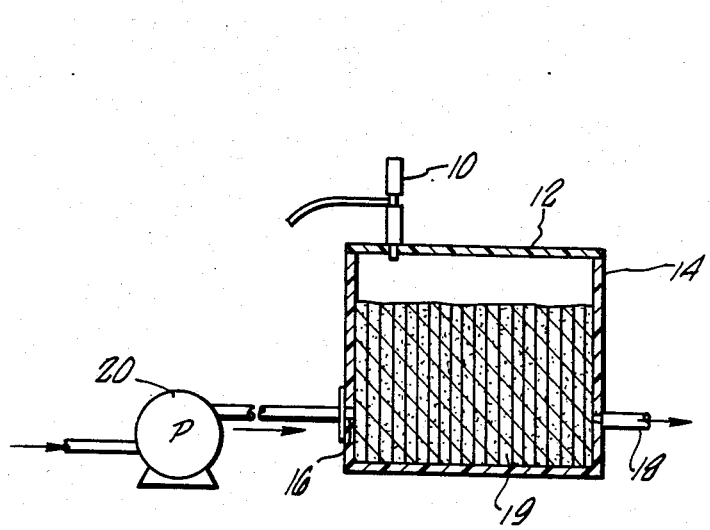
FIG_1_
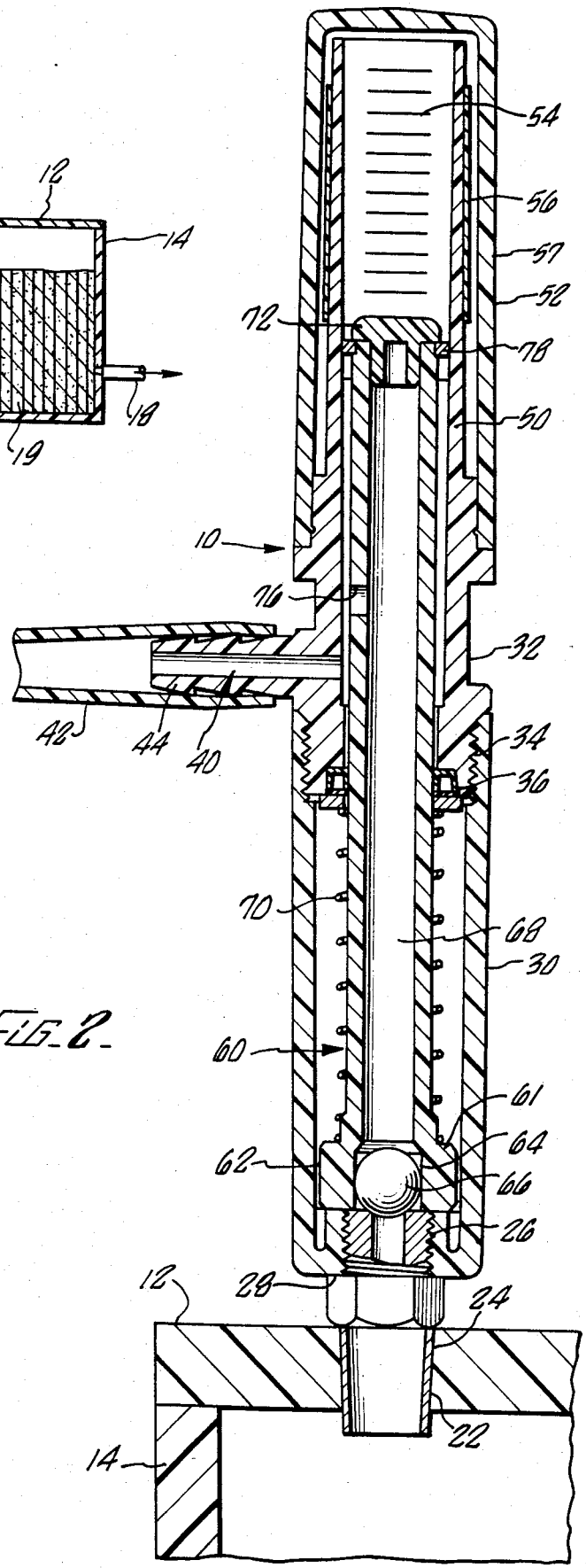
FIG_2_

PRESSURE INDICATOR

BACKGROUND OF THE INVENTION

A. Field of the Invention

This invention relates to pressure gauges and particularly to means and methods for advising the pool owner of the condition of the swimming pool filter system and permitting bleed air into the filter system and evacuating air under high pressure from the filter system.

B. Description of the Prior Art

In swimming pools it is necessary to provide a filter system to remove foreign matter from the water thus providing a clean and aesthetically desirable swimming pool. This is accomplished by constructing a filter system remote from the swimming pool and pumping pool water from the pool through the filter system and back into the swimming pool.

The filter system is customarily constructed of a tank which contains a filter element or elements arranged between the pool water inlet and pool water outlet of the tank. The filter element normally comprises either a series of particle screens or accumulations of diatomaceous earth contained within a series of cloth enmeshments. Because of its cost and effectiveness, diatomaceous earth has become the most favored material for use in the filter system. When using diatomaceous earth the tank is normally filled with the diatomaceous earth to a level below the top of the tank.

Swimming pool water normally contains a great deal of air because of the turbulence caused by the use of the swimming pool. In addition, spas also require a filter system and these spas have water which has a high concentration of air bubbles because of the use of high powered jets to direct water into the spa. Consequently, the water entering the filter system of either a swimming pool or a spa is normally laden with air bubbles.

After the air-laden pool water enters the filter system the filter element is useful to remove foreign particles from the pool water and trap the foreign particles, thus permitting only clean water to flow back into the swimming pool. The air bubbles in the pool water are also removed by the filter system and these air bubbles have a tendency to accumulate at the top of the tank above the filter element.

When new the filter element permits the air collected above it to pass back into the filter system and out into the swimming pool after the filter system has been turned off. However, after the filter system has been used for a period of time, the filter element becomes dirty and clogged and prevents the passage of air back into the swimming pool. Thus, air pressure builds within the tank above the filter element. This pressure may be hazardous, because to change the filter element it is necessary to unbolt or otherwise unfasten the top of the tank containing the filter element and remove the filter element from the tank. If the pressure build-up is sufficiently high, the top of the tank may become a projectile and fly off of the tank possibly injuring the pool owner.

It is also desirable to provide a filter system which will indicate to the pool owner the condition of the filter element and advise the pool owner when the filter element needs to be changed.

Under certain operating conditions the filter system may also have a vacuum created within the tank, thus reducing the usability of the filter system. Therefore, it is also desirable to have a pressure gauge which will bleed air into the filter system to prevent the occurence of a vacuum within the filter system.

It is well known that a valve may be provided with a filter system above the filter element to bleed air out of the tank. However, pool owners often forget to open the valve prior to changing the filter element. This situation leads to possible problems as discussed above wherein the top of the tank may become a harmful projectile.

It is also known that pressure gauges may be installed in the filter system to advise the pool owner of the condition of the filter system. However, these pressure gauges do not have the ability to bleed air in and out of the system, thus leaving potential hazards. Furthermore, these pressure gauges are often difficult to read and thus pool owners are often reluctant to do so.

SUMMARY OF THE INVENTION

It is an object of the present invention to provide a pressure gauge capable of being set at one time to compensate for different pressure conditions occasioned by different plumbing, filters and pumps within a filter system as used with a swimming pool.

It is a further object of the present invention to provide a pressure gauge which will advise the pool owner of the condition of the filter element and advise the pool owner when the filter element needs to be cleaned or changed.

It is another object of the present invention to provide a pressure gauge which is operative to automatically bleed air out of the filter system to prevent the occasion of a high pressure air build-up within the filter system and the potentially hazardous results when changing filter elements.

It is another object of the present invention to provide a pressure gauge that leaks air out of the filter system at the time of system start-up and automatically bleeds air back into the filter system to assist in the break-up of filter element cake thus insuring longer filter life cycle.

The above objects are achieved by employing a combined pressure relief line with a pressure gauge to form a single integral unit. The unit is attached to the top of the filter system tank and provides constant monitoring of the filter system and equipressure operation.

A slidable piston assembly is movable within the pressure gauge but is biased into contact with the lower portion of the gauge. The piston assembly is hollow and has a ball bearing disposed at its lowermost portion. The piston assembly has an aperture disposed along its length to permit passage of air from the filter system out through the piston assembly and out a relief line provided with the pressure gauge, thus causing bleed air to pass out of the filter system when the pump is turned on. When the pump is turned off the piston assembly is adapted to provide for bleed air to pass into the filter system to maintain equipressure within the system.

The upper portion of the pressure gauge is clear to permit the pool owner to observe the position of the piston within the pressure gauge. Indicating lines may be supplied at the top of the gauge which will show the pressure within the filter system as the top of the piston assembly moves along the indicator lines. Thus, the pool owner is continuously advised of the pressure within the filter system.

A relief line is provided along the pressure gauge to assist in bleeding of air out of the filter system and bleeding of air into the system in accordance with the operation of the filter system.

In operation the ball bearing will move to permit passage of air out of the filter system and out of the relief line into the atmosphere. Upon turning on the pump of the filter system, water will eventually cause the ball bearing to seat in the bottom of the piston thus restricting air passage out of the filter system and causing the piston to move within the gauge to advise the owner of the pressure within the filter system. The pressure gauge spring may be calibrated to associate particular pressures within the system with the position of the piston within the pressure gauge.

BRIEF DESCRIPTION OF THE DRAWINGS

FIG. 1 is a side cross-sectional view of the filter system showing the position of the pressure gauge at the top of the filter tank.

FIG. 2 is a side cross-sectional view of the pressure gauge of the present invention.

DESCRIPTION OF THE PREFERRED EMBODIMENT

Referring to FIG. 1, there is shown a cross section of the invention of the present application as it is used in a swimming pool filter system. Briefly, the pressure gauge 10 is provided along the top 12 of the tank 14 of a filter system as used with a swimming pool or spa. Bolts (not shown) or other clamping or attachment mechanisms may be provided to secure the top 12 to the tank 14. Within the tank 14 an accumulation of filter element material 19 is present to provide for filtering and cleaning of the swimming pool water.

Customarily the filter element 19 is comprised of a series of clothes (not shown) which have a substantial amount of diatomaceous earth between each cloth. In other embodiments, the diatomaceous earth may be placed in a series of bags and placed within the tank 14. An inlet 16 is provided to direct the flow of water into the filter element 19 and an outlet 18 is provided to direct the flow of water from the filter element 19 and back into the swimming pool. A pump 20 is operative to cause water to move from the swimming pool and push the water into the filter element 19. Other pump mechanisms (not shown) may be provided to pull the water from the filter element 19 and return the water to the swimming pool.

Referring to FIG. 2, the pressure gauge 10 of the present invention is shown in cross section as attached to the top 12 of the tank 14. An aperture 22 is provided in the top 12 of the tank 14. The top 12 surrounding the aperture 22 is threaded to receive a nipple 24 which is attached to the lowermost portion of the pressure gauge 10. The nipple 24 has at its upper portion a threaded section 26 which is receivable into a lower threaded section 28 of the pressure gauge 10 and provides for the secured fastening of the nipple 24 to the pressure gauge 10. Appropriate sealing means (not shown) may be provided between the nipple 24 and the pressure gauge 10 to prevent the leakage of fluid from the pressure gauge 10.

The pressure gauge 10 comprises a lower portion 30 which extends upwardly from the nipple 24 and meets an intermediate portion 32. The lower portion 30 and intermediate portion 32 are attached to each other at the threaded section 34. Between the lower portion 30 and the intermediate portion 32 a seal (not shown) may be provided. Extending outwardly from the intermediate portion 32 is a bleed line 40 which permits passage of air out of the pressure gauge 10 into the atmosphere and from the atmosphere into the pressure gauge 10. The line 40 may have a hose 42 attached to direct the air to the desired location. Serrations 44 are provided between the line 40 and the hose 42 to rigidly fix the hose 42 to the line 40.

The intermediate portion 32 has an upwardly extending cylinder 50 which resides within an upper portion 52 of the pressure gauge 10. The upper portion 52 and cylinder 50 are concentric with each other with appropriate attachment means (not shown) provided at the lowermost section of the upper portion 52 and cylinder 50. The upper portion 52 is constructed of clear plastic so that it is possible to view the inside of the cylinder 50. A plurality of lines 54 may be provided on the uppermost portion of the cylinder 50 to indicate pressure graduations in the pressure gauge 10. A slidable indicator 56 may be provided around the cylinder 50 which is movable in an upward and downward direction to indicate the pressure at which the pool owner should change the filter element 19.

A piston 60 is slidable within the pressure gauge 10 and moves in an upward and downward direction within the lower portion 30, the intermediate portion 32 and the cylinder 50. The piston 60 has an extended shoulder 62 at its lowermost side and within that extended shoulder there is provided a channel 64. Disposed within the channel 64 is a ball bearing 66 which is movable from a position wherein it is not seated within the channel 64 to a position where it seats within the channel 64 against the piston 60 thus closing off a channel 68 contained within the piston 60.

A spring 70 is disposed between the intermediate portion 32 and the upper surface 61 of the extended shoulder 62 and is operative to bias the piston 60 into the lowermost position within the pressure gauge 10. The spring 70 may be calibrated such that movement of the piston 60 against the action of the spring 70 will indicate a pressure within the filter system. At the uppermost portion of the piston 60 a plug 72 is provided which may be made of colored material to indicate the position of the piston 60 within the cylinder 50. The plug 72 will pass along the indicator lines 54 contained within the upper portion of the pressure gauge 10 to indicate the pressure within the filter system.

A bleed hole 76 is provided along the shaft of the piston 60 and provides a passageway for air to pass through the channel 68 of the piston 60 and out the line 40. Sealing elements 78 may be provided at the uppermost portion of the piston 60 to prevent passage of air into the upper portion of the cylinder 50. The sealing elements 78 are also operative to guide the piston 60 through the cylinder 50. In the preferred embodiment, sealing elements 36 are also provided within the intermediate portion 32 to seal the passage-way between the piston 60 and the intermediate portion 32.

In operation, the pump 20 is turned on permitting fluid to pass into the filter tank 14 and through the filter element 19. In the start-up condition, the line 40 will permit air to pass out of the gauge 10, thus the pump 20 is pushing against atmospheric pressure. This extends pump life. As the water is pumped through the filter element 19, the trapped air bubbles within the water are collected in the upper portion of the tank 14 above the filter element 19. These air bubbles without the presence of a pressure relief system would cause a high pressure to be created within the upper portion of the tank 14, thus creating a hazard when the pool owner desired to remove the top 12 to replace the filter element 19. Therefore, the pressure gauge 10 of the present invention is provided within the top 12 of the tank 14 to indicate air pressure within the tank 14 and also to provide a bleed capability to remove the high pressure air from above the filter element 19.

Referring to FIGS. 1 and 2, as the pump 20 is turned on, the air that is contained above the filter element 19 passes through the aperture 22 and into the pressure gauge 10. The air causes the ball bearing 66 to rise slightly within the piston 60 and the air will pass around the ball bearing 66 and into the channel 68. Once the air is in the channel 68, it passes through the aperture 76 and out of the line 40. Thus, any trapped air above the filter element 19 will be relieved through the use of the pressure gauge 10.

As the pool water fills the tank 14, the water will also pass through the aperture 22 and into the pressure gauge 10. As the water passes into the pressure gauge 10, it causes the ball bearing 66 to seat in the channel 64 against the piston 60. Some water may pass between the lowermost portion 30 and the piston 60 and be retained there. However, as the water pressure builds within the filter system, the piston 60 will move upwardly against the biasing action of the spring 72. As the piston 60 moves upward, it provides an indication of the pressure within the filter system. It should be noted that, most pool filters operate at 10 to 20 lbs. pressure. As the filter element becomes dirty and clogged, the pressure increases, thus the piston 60 will move further up within the pressure gauge 10 and provide an indication to the pool owner of the cleanliness condition of the filter element 19.

When the pump is turned off, the water pressure within the filter system drops and the ball bearing 66 will unseat from the lowermost portion of the piston 60. Thus, bleed air is permitted to pass through the line 40 through the aperture 76 and back into the tank 14. In this manner a vacuum is not created within the filter system and removal of the top 14 is facilitated.

Use of the present invention provides many benefits to the pool operator. Because of the easy passage of air into and out of the piston assembly 60, the filter element 19, which customarily comprises diatomaceous earth, is constantly stirred up thus increasing the cycle time between cleaning of the filter element 19. Furthermore, because of the ability of the pressure gauge 10 of the present invention to relieve trapped air above the filter element 19 it is possible to place more filter element 19 within the tank 14.

In accordance with the objects of the present invention, the pressure gauge 10 advises the pool owner when the filter element 19 needs to be cleaned because the piston 60 will move into a position within the cylinder 50 which will illustrate the operating pressure of the filter system.

Finally, the ability of the pressure gauge 10 to automatically permit passage of air into and out of the filter system will provide the ability to reduce the pressure within the filter tank 14 and also reduce the possibility of a vacuum being created within the filter tank 14.

By setting the slidable indicator 56 along the cylinder 50, it is possible to advise the pool operator when the filter element 19 needs cleaning. Thus, the pressure gauge 10 is capable of being set at one time to compensate for differential pressures caused by the different plumbing, filters and pumps used within the filter system.

Although one example of the present invention has been shown by description and illustration, it should be understood that there are many other arrangements and embodiments of the present invention within the scope of the following claims.

What is claimed is:

1. A pressure gauge for use with a swimming pool filter system or the like, the pressure gauge comprising:
   a housing;
   hollow piston means disposed within the housing and movable from a first position to a second position;
   spring means disposed within the housing to bias the piston means into the first position;
   means for relieving high pressure gas within the filter system, the relieving means integral with the housing;
   ball bearing means adapted to seal the piston means to occasion movement of the piston means in accordance with the pressure in the filter system from the first position to the second position to indicate pressure in the filter system.

2. The pressure gauge of claim 1 which includes, indicator means disposed along the housing to indicate pressure within the filter system.

3. The pressure gauge of claim 2 which includes slidable means movable along the housing to indicate a pressure predetermined condition in the filter system.

4. The pressure gauge of claim 1 which include sealing means disposed between the piston means and the housing.

5. The pressure gauge of claim 1, wherein the piston means comprises:
   a hollow cylinder having a first end and second end;
   a ball bearing selectively operative to seal the first end of the cylinder;
   a plug operative to seal the second end of the cylinder;
   a shoulder to receive the spring means to bias the cylinder into the first position;
   an aperture disposed along the cylinder to facilitate passage of air out of the cylinder and into the relieving means.

6. A pressure gauge for use with a swimming pool filter system or the like, the pressure gauge comprising:
   a housing, the housing having a lower portion and an intermediate portion;
   a piston movable with the housing from a first lowermost position to a second position;
   a spring disposed with the housing to bias the piston into the first lowermost position;
   seal means disposed between the piston and the housing;
   a relief line integral with the housing to facilitate passage of air from the filter system through it and into the atmosphere;
   indicator means to illustrate pressure within the filter system, the indicator means integral with the housing.

7. The pressure gauge of claim 6, wherein the piston comprises:
   a hollow cylinder having a first end and a second end;
   a plug disposed at the second end of the cylinder;
   a ball bearing selectively seated within the first end of the cylinder;
   an aperture disposed along the cylinder to bleed air out of the cylinder and into the relief line.

8. A pressure gauge for use within a fluid tank of system, the pressure gauge comprising:
- a housing, the housing having a lowermost portion and an intermediate portion;
- means for attaching the lowermost portion to the filter system;
- a hollow piston having a first end and second end and adapted to move from a first lowermost position within the housing to a second position within the housing;
- a seal disposed between the lowermost portion and the piston;
- a spring to bias the piston into the first lowermost position;
- cylinder means attached to the intermediate portion to guide the piston;
- a relief line integral with the intermediate portion;
- an aperture disposed along the piston to permit air within the piston to move into the relief line;
- a ball bearing selectively adapted to seal the first end of the piston;
- a plug to seal the second end of the piston, wherein the ball bearing is selectively operative to seal the first end of the piston to cause movement of the piston within the housing from the first lowermost position to the second position to indicate pressure within the filter system.

* * * * *